United States Patent
Hwang et al.

(10) Patent No.: US 10,852,527 B2
(45) Date of Patent: Dec. 1, 2020

(54) VEHICLE HAVING DISPLAY AND METHOD FOR CONTROLLING THE SAME

(71) Applicants: HYUNDAI MOTOR COMPANY, Seoul (KR); KIA MOTORS CORPORATION, Seoul (KR)

(72) Inventors: Woojin Hwang, Hwaseong-si (KR); Jongkyo An, Osan-si (KR); EupJung Choi, Daegu (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 147 days.

(21) Appl. No.: 16/202,746

(22) Filed: Nov. 28, 2018

(65) Prior Publication Data
US 2020/0073111 A1    Mar. 5, 2020

(30) Foreign Application Priority Data
Sep. 5, 2018   (KR) .................... 10-2018-0106019

(51) Int. Cl.
*G02B 26/02*   (2006.01)
*G02B 26/00*   (2006.01)
*G02B 1/11*    (2015.01)

(52) U.S. Cl.
CPC .............. *G02B 26/02* (2013.01); *G02B 1/11* (2013.01); *G02B 26/004* (2013.01)

(58) Field of Classification Search
CPC ........ G02B 1/10; G02B 26/02; G02B 26/004; G02B 1/11–118; G02B 5/02–0294; G02B 5/285–287; G02B 5/27–0018; G02B 2207/123; G02B 26/08–0816; G02F 1/1681
USPC ....................................................... 359/297
See application file for complete search history.

(56) References Cited

U.S. PATENT DOCUMENTS 9,588,336 B1 *   3/2017   Boon .................. G03F 7/20

FOREIGN PATENT DOCUMENTS

KR   10-2016-0120517 A   10/2016

* cited by examiner

*Primary Examiner* — Kristina M Deherrera
(74) *Attorney, Agent, or Firm* — Morgan, Lewis & Bockius LLP

(57) ABSTRACT

A vehicle includes a display; a glass panel disposed on the front side of the display; and an antireflection film disposed on the front side of the glass panel. The antireflection film may include a plurality of partition walls spaced apart from each other, and the plurality of partition walls may be converted into a transparent state and a black state.

8 Claims, 4 Drawing Sheets

VEHICLE HAVING DISPLAY AND METHOD FOR CONTROLLING THE SAME

CROSS-REFERENCE TO RELATED APPLICATION(S)

This application is based on and claims the benefit of priority to Korean Patent Application No. 10-2018-0106019, filed on Sep. 5, 2018 in the Korean Intellectual Property Office, the disclosure of which is incorporated by reference in its entirety.

TECHNICAL FIELD

Embodiments of the present disclosure relate to a vehicle having a display for displaying a state of the vehicle and the like, and a method for controlling the same.

BACKGROUND

Generally, a vehicle may include a display for providing a variety of image information to a driver.

The display included in the vehicle may provide a variety of the image information to the driver through an instrument panel or a navigation system for displaying a state of the vehicle.

On the front side of the display on which the driver is located, a glass panel having sufficient strength may be disposed while light is normally transmitted.

However, a part of the light generated in the display may be transmitted to a windshield glass at the front of the vehicle, and the display screen may appear to have a ghost image problem that looks like an afterimage on the windshield glass.

SUMMARY

Therefore, it is an aspect of the present disclosure to provide a vehicle capable of more effectively suppressing a ghost image problem that may occur on a display, and a method for controlling the same.

Additional aspects of the disclosure will be set forth in part in the description which follows and, in part, will be obvious from the description, or may be learned by practice of the disclosure.

In accordance with an aspect of the present disclosure, a vehicle includes: a display; a glass panel disposed on a front side of the display on which a driver is located, and configured to transmit light through the glass panel; and an antireflection film disposed on a front side of the glass panel. The antireflection film may include a plurality of partition walls spaced apart from each other and configured to be converted between a transparent state and a black state; and a front film formed of a transparent material and disposed to cover a front side of the plurality of partition walls.

The plurality of partition walls may be vertically spaced apart from each other and in parallel to each other.

The antireflection film may include a rear film disposed to cover a rear side of the plurality of partition walls.

The plurality of partition walls may be formed of hollow transparent tubes. The plurality of partition walls may further include a transparent fluid supply device configured to supply a transparent fluid into the partition walls; and a black fluid supply device configured to supply a black fluid into the partition walls.

The plurality of partition walls may have a cross-section, a length of which in a vertical direction narrows from a rear side of the plurality of partition walls where the glass panel is positioned to the front side of the plurality of partition walls where the driver is located.

The transparent fluid and the black fluid may each include an anti-freezing liquid.

The vehicle may further include: an illuminance detection sensor configured to detect illuminance outside the vehicle; and a controller configured to selectively operate the transparent fluid supply device and the black fluid supply device according to the illuminance outside the vehicle detected by the illuminance detection sensor.

The controller may operate the transparent fluid supply device when the illuminance detected by the illuminance detection sensor is equal to or higher than a predetermined level, and operate the black fluid supply device when the illuminance detected by the illuminance detection sensor is less than the predetermined level.

In accordance with another aspect of the present disclosure, a method for controlling a vehicle includes: detecting illuminance outside the vehicle by an illuminance detection sensor; converting, by a controller, partition walls of an antireflection film into a transparent state when the illuminance outside the vehicle detected by the illuminance detection sensor is equal to or higher than a predetermined level; and converting, by the controller, the partition walls into a black state when the illuminance outside the vehicle detected by the illuminance detection sensor is less than the predetermined level.

The partition walls may be formed in a shape of hollow transparent tubes. The method may further include: converting the partition walls into the transparent state by supplying a transparent fluid to the partition walls through a transparent fluid supply device; and converting the partition walls into the black state by supplying a black fluid to the partition walls through a black fluid supply device.

The method may further include: recovering the black fluid to the black fluid supply device by supplying the transparent fluid to the partition walls through the transparent fluid supply device; and recovering the transparent fluid to the transparent fluid supply device by supplying the black fluid to the partition walls through the black fluid supply device.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
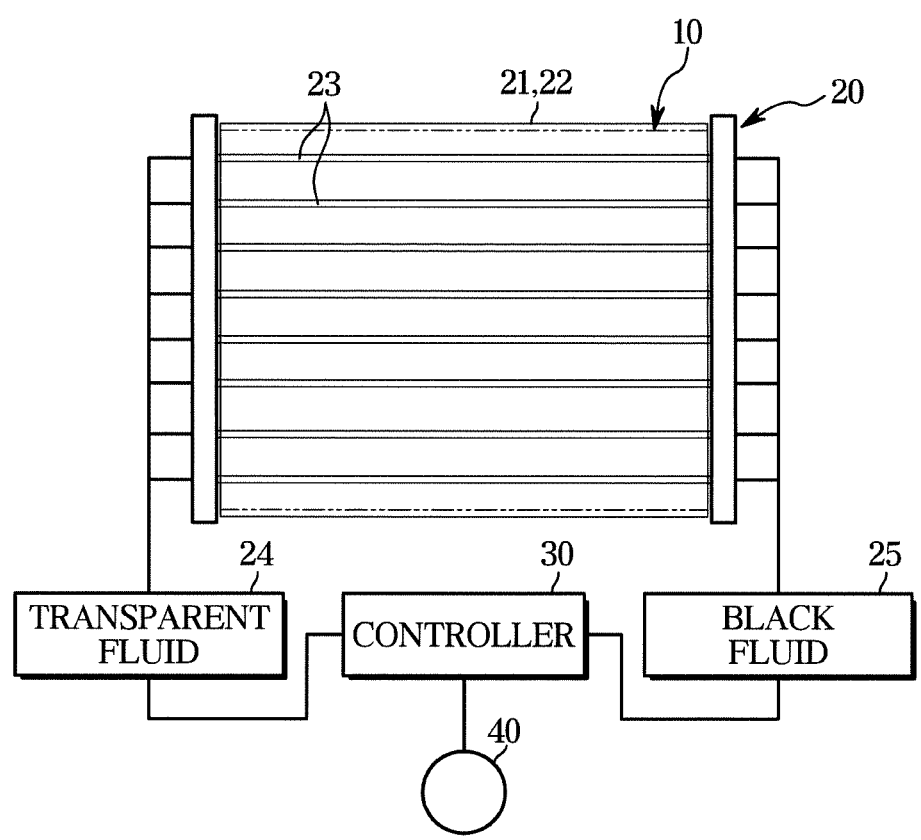
FIG. 1 is a front view illustrating a display device and an antireflection film of a vehicle according to an embodiment, in which partition walls are in a transparent state.

Embodiments described herein and configurations illustrated in the accompanying drawings are only exemplary examples of the present disclosure, and various modifications may be made at the time of filing of the present application to replace the embodiments and drawings of the present disclosure.

In addition, throughout the accompanying drawings of the present disclosure, the same reference numerals or symbols are used to designate parts or elements performing substantially the same function.

Terms used herein are intended to only describe certain embodiments, and shall by no means restrict and/or limit the present disclosure. Unless clearly used otherwise, expressions in a singular form include the meaning in the plural form. In the present disclosure, terms such as "comprising" and "including" are intended to designate the presence of characteristics, numbers, steps, operations, elements, parts or combinations thereof, and shall not be construed to preclude any possibility of presence or addition of one or more other characteristics, numbers, steps, operations, elements, parts or combinations thereof.

In addition, the terms such as "upper side" and "lower side," "upper surface" and "lower surface," and "front surface" and "rear surface" used in the present disclosure are defined based on the accompanying drawings, and the shape and position of each element are not limited by these terms.

Hereinafter, exemplary embodiments of the present disclosure will be described in detail with reference to the accompanying drawings.

Figure 3:
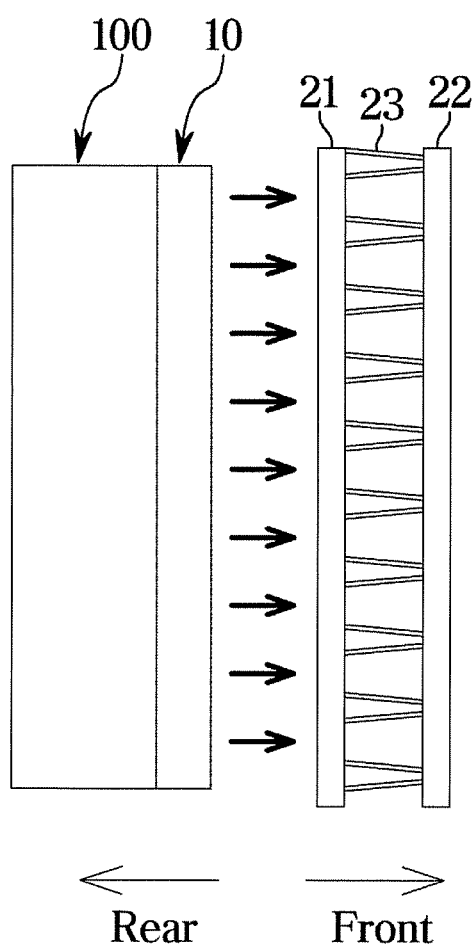
FIG. 3 is a side view illustrating the display device and the antireflection film of the vehicle according to an embodiment, in which the partition walls are in the transparent state.

As illustrated in FIGS. 1 and 3, a vehicle according to an aspect of the present disclosure may include various displays 100, and a glass panel 10 disposed on the front side of the display 100. Here, the glass panel 10 may form the front surface of the display 100 or may be formed separately from the display 100. Further, the glass panel 10 may be disposed apart from the display 100.

On the front side of the glass panel 10, an antireflection film 20 for preventing a ghost image problem is disposed. The antireflection film 20 may be attached to the front surface of the glass panel 10.

The antireflection film 20 may include a plurality of partition walls 23 arranged parallel to and spaced apart from each other, a front film 21 disposed to cover the front side of the partition walls 23 on which a driver is located, and a rear film 22 disposed to cover the rear side of the partition walls 23 on which the display 100 is positioned.

The partition walls 23 may be converted between a transparent state and a black state to selectively suppress the ghost image problem due to an exterior illumination.

The partition walls 23 may be formed of a hollow transparent tube so that the partition walls 23 can be converted between the transparent state and the black state.

The vehicle may also include a transparent fluid supply device 24 for supplying a transparent fluid into the partition walls 23, a black fluid supply device 25 for supplying a black fluid into the partition walls 23, a controller 30 for controlling an operation of the transparent fluid supply device 24 and the black fluid supply device 25, and an illuminance detection sensor 40 for detecting illuminance outside the vehicle.

The transparent fluid and the black fluid may be made of an anti-freezing liquid in case the vehicle is operated at a low temperature such as in the winter.

The partition walls 23 may be spaced vertically apart from each other and may be formed to have a cross-section, the length of which in a vertical direction narrows from the rear side where the display 100 is positioned to the front side where the driver is located.

Here, the partition walls 23 may be vertically spaced apart. However, the partition walls 23 may be spaced apart from each other in the left and right directions, and the partition walls 23 may be vertically and horizontally spaced to form a lattice shape.

The following will be described as a method for controlling the vehicle.

The ghost image problem of the vehicle generally does not occur during the day when the illuminance outside the vehicle is high, but occurs mainly at night when the illuminance outside the vehicle is low.

Therefore, the illuminance detection sensor 40 may identify the illuminance outside the vehicle.

The controller 30 may operate the transparent fluid supply device 24 to supply the transparent fluid into the partition walls 23 when the illuminance outside the vehicle detected by the illuminance detection sensor 40 is equal to or higher than a predetermined level. Thus, when the transparent fluid supply device 24 supplies the transparent fluid, the black fluid may be recovered to the black fluid supply device 25.

When the transparent fluid is supplied to the partition walls 23, the partition walls 23 may be converted into the transparent state.

When the partition walls 23 are in the transparent state, the light generated in the display 100 and passing through the glass panel 10 may be directly transmitted to the driver so that the driver can easily recognize information displayed on the display 100. At this time, a part of the light generated in the display 100 may be irradiated by the windshield glass of the vehicle, but is insignificant when compared to the amount of light supplied through the windshield glass from outside the vehicle, thus the driver cannot recognize it.

On the contrary, the controller 30 may operate the black fluid supply device 25 to supply the black fluid into the partition walls 23 when the illuminance outside the vehicle detected by the illuminance detection sensor 40 is less than the predetermined level. Thus, when the black fluid supply device 25 supplies the black fluid, the transparent fluid may be recovered to the transparent fluid supply device 24.

Figure 2:
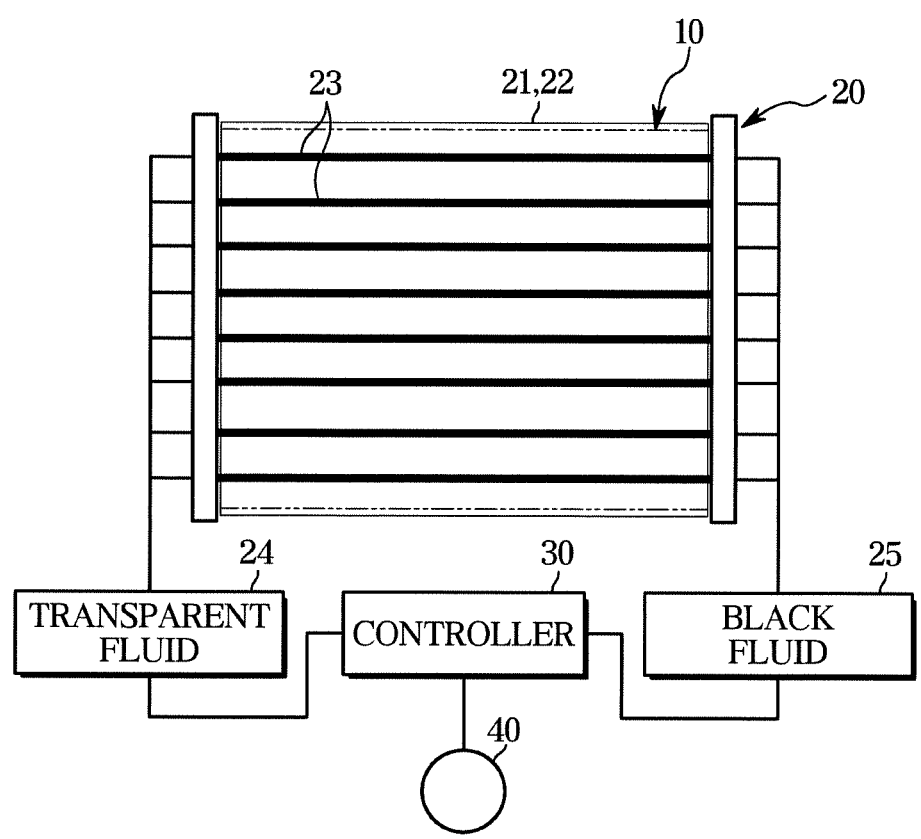
FIG. 2 is a front view illustrating the display device and the antireflection film of the vehicle according to an embodiment, in which the partition walls are in a black state.
Figure 4:
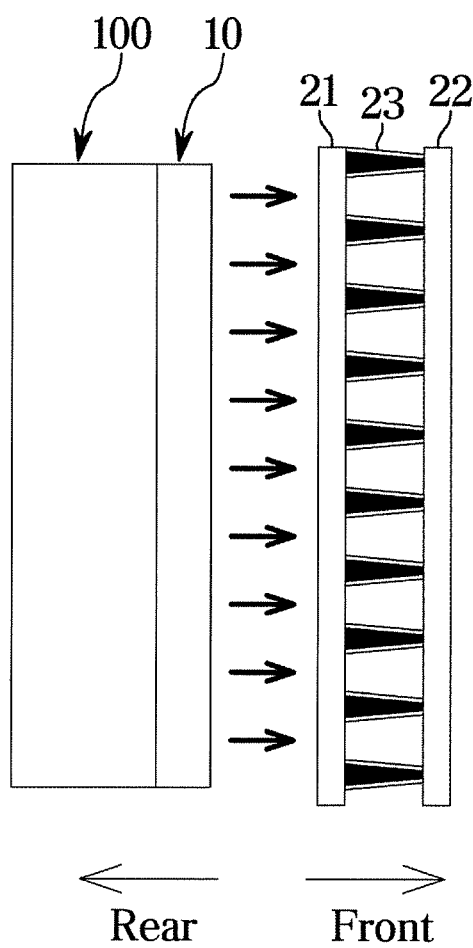
FIG. 4 is a side view illustrating the display device and the antireflection film of the vehicle according to an embodiment, in which the partition walls are in the black state.

When the black fluid is supplied to the partition walls 23, the partition walls 23 may be converted into the black state as illustrated in FIGS. 2 and 4.

When the partition walls 23 are in the black state, the light generated in the display 100 and irradiated toward the driver among the light transmitted through the glass panel 10 may pass through the antireflection film 20 and may be directly transmitted to the driver. The light irradiated toward the windshield glass at the front of the vehicle may be absorbed by the partition walls 23, which are mostly black.

Therefore, the ghost image problem that may occur when the light generated in the display 100 is irradiated to the windshield glass at the front of the vehicle may be suppressed.

At this time, part of the light generated in the display 100 is partially absorbed by the partition walls 23, so that the illuminance of the display 100 is lowered. However, the driver may easily recognize the information displayed on the display 100 due to the scotopia even if part of the light generated in the display 100 is absorbed by the partition walls 23 in the black state because the illuminance outside the vehicle is very low.

As is apparent from the above description, the vehicle according to the embodiment can effectively suppress the occurrence of the ghost image on the windshield glass of the vehicle as the partition walls of the antireflection film are converted into the transparent state and the black state.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. A vehicle comprising:
a display;
a glass panel disposed on a front side of the display on which a driver is located, and configured to transmit light through the glass panel; and
an antireflection film disposed on a front side of the glass panel,
wherein the antireflection film comprises:
a plurality of partition walls spaced apart from each other, configured to be converted between a transparent state and a black state; and
a front film formed of a transparent material and disposed to cover a front side of the plurality of partition walls.

2. The vehicle according to claim 1, wherein the plurality of partition walls are vertically spaced apart from each other and in parallel to each other.

3. The vehicle according to claim 1, wherein the antireflection film comprises a rear film disposed to cover a rear side of the plurality of partition walls.

4. The vehicle according to claim 1, wherein the plurality of partition walls are configured to be formed of hollow transparent tubes, and
wherein the plurality of partition walls further comprises:
a transparent fluid supply device configured to supply a transparent fluid into the partition walls; and
a black fluid supply device configured to supply a black fluid into the partition walls.

5. The vehicle according to claim 4, wherein the plurality of partition walls are configured to have a cross-section, a length of which in a vertical direction narrows from a rear side of the plurality of partition walls where the glass panel is positioned to the front side of the plurality of partition walls where the driver is located.

6. The vehicle according to claim 4, wherein the transparent fluid and the black fluid each comprise an anti-freezing liquid.

7. The vehicle according to claim 4, further comprising:
an illuminance detection sensor configured to detect illuminance outside the vehicle; and
a controller configured to selectively operate the transparent fluid supply device and the black fluid supply device according to the illuminance outside the vehicle detected by the illuminance detection sensor.

8. The vehicle according to claim 7, wherein the controller is configured to operate the transparent fluid supply device when the illuminance detected by the illuminance detection sensor is equal to or higher than a predetermined level, and operate the black fluid supply device when the illuminance detected by the illuminance detection sensor is less than the predetermined level.

* * * * *